Aug. 13, 1968   J. M. GILLIS   3,396,779
COMBINED VEHICLE RADIATOR AND REFRIGERANT CONDENSER
Filed Dec. 8, 1966

James M. Gillis
INVENTOR.

BY *Clarence A. O'Brien*
and *Harvey B. Jacobson*
Attorneys

United States Patent Office 3,396,779
Patented Aug. 13, 1968

3,396,779
COMBINED VEHICLE RADIATOR AND
REFRIGERANT CONDENSER
James M. Gillis, 7907 Indian Head Highway,
Washington, D.C. 20021
Filed Dec. 8, 1966, Ser. No. 600,134
6 Claims. (Cl. 165—42)

ABSTRACT OF THE DISCLOSURE

A combined vehicle radiator and refrigerant condenser for an automotive vehicle having an air conditioning system for cooling the interior thereof and a water cooled engine wherein the vehicle radiator is provided with portions thereof blanked out or left open for reception of the condenser coils of the air conditioning system with the condenser coils being insulated from the radiator tubes so that there is no heat transfer between the refrigerant condenser coils and the radiator tubes.

An important object of the present invention is to achieve ample cooling of the passenger compartment of an automotive vehicle while at the same time avoiding overheating of the engine block.

Another important object of the present invention is to provide a combined vehicle radiator and refrigerant condenser arrangement for an automotive vehicle whereby the condenser does not occupy needed space in front of an automobile radiator or in some other position but rather is located within blocked out portions in the radiator unit itself so that the condenser unit and radiator unit are disposed in side-by-side relation transversely of the longitudinal axis of the vehicle with insulation means interposed between the two units so that heat from the condenser unit cannot be transferred into the water cooling radiator unit and the heat from the water cooling radiator unit cannot be transferred to the refrigerant in the condenser unit and whereby the two units, in side by side insulated relationship, transversely of the longitudinal axis of the vehicle, are arranged so that cool air flows through both separate and individual units at the same temperature for both.

A further important object of the present invention is to provide in an automotive vehicle having an air conditioning system for cooling the interior thereof and a water cooled engine, a radiator and refrigerant condenser arrangement that is compact, simple, economical and most efficient and whereby the condenser unit is arranged and mounted as a separate unit with respect to the radiator unit so that it can be removed as an entity therefrom, without disrupting the mounting and operation of the radiator unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
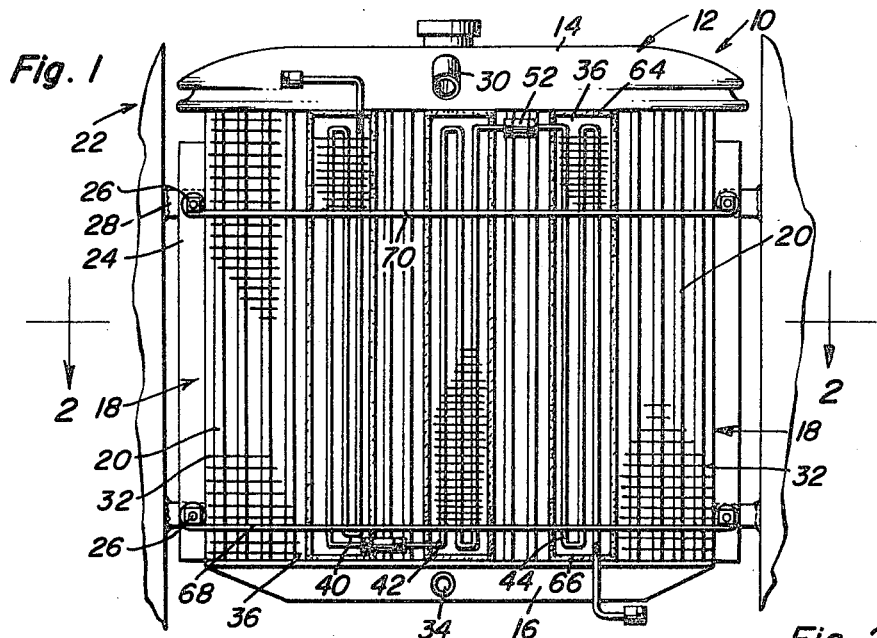
FIGURE 1 is a rear elevational view of the combined vehicle radiator and refrigerant condenser arrangement for an automotive vehicle having an air conditioning system for cooling the interior thereof and a water cooled engine.

Referring now more particularly to the accompanying drawings, the combined vehicle radiator and refrigerant condenser arrangement 10 includes a radiator unit 12 which is composed of a single common upper header 14 and a single common lower header 16. The radiator unit 12 is further composed of groupings 18 of vertically disposed tubes 20 which extend betwen the headers, the groupings 18 being spaced apart transversely of the longitudinal axis of the automotive vehicle, the frame of which is generally designated by the reference numeral 22. The radiator unit is provided at its opposing sides with attaching supports 24, which are secured by bolt means 26 to mounting and supporting brackets 28 carried by the frame so that the radiator unit is disposed transversely of the longitudinal axis of the frame.

The radiator unit functions in a conventional manner so that the upper header 14 is provided with a hot water return hose 30 which extends from the engine manifold block to deliver water into the upper header with the water flowing down through the tubes 20 of each of the groupings 18 into the lower header 16. As the water flows down through the tubes 18, the water is cooled by means of air flowing over the fins 32 which are provided on the tubes 18. The cooled water in the lower header 16 is returned through a hose 34 into the manifold block of the engine to be recirculated therethrough for the purpose of cooling the engine.

The difficulty that has arisen in an automobile having an air conditioning system is that it has been extremely difficult to position the condenser because of space consideration. Usually, the condenser is positioned in front of the automobile radiator which placement has definite disadvantages.

In accordance with the present invention, the radiator unit is formed by virtue of the laterally spaced apart groupings 18 of the finned header connecting radiator tubes 20 with blanked out or open spaces 36, as shown in FIGURE 1. Such spaces are designed to be occupied by the condenser unit, generally designated by the reference numeral 38. The condenser unit includes laterally spaced coil arrangements 40, 42 and 44, for example, which are adapted to fit within the spaces 36. The coil unit 40, 42 and 44 consist of pipings 46, having cooling fins 48 that fit horizontally, in vertically spaced fashion within the spaces 36 between the groupings 18 of the radiator tubes 20. The condenser coils or coil units 40, 42 and 44 are interconnected in flow interconnected relationship by couplings 50 and 52, which outstand rearwardly or forwardly from the radiator to enable the sections of the condenser coil to be independently replaced in the event of damage due to an accident or the like. The condenser coils terminate in end connectors 56 for connection with the remainder of the system to enable ease of installation.

Figure 2:
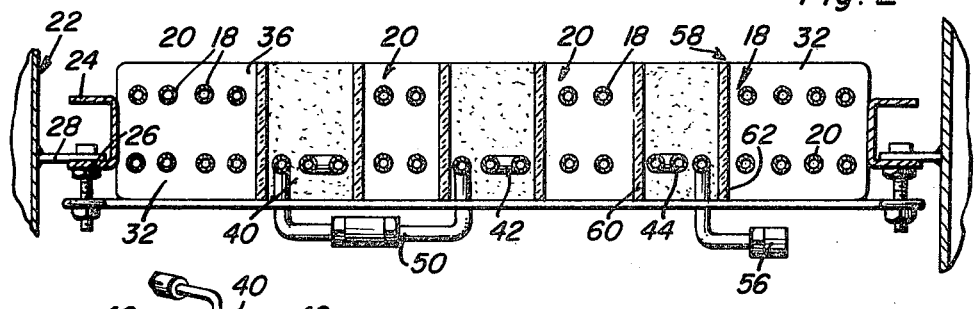
FIGURE 2 is a transverse, horizontal sectional view, taken substantially on line 2—2 of FIGURE 1.

The blanked out or left open spaces 36 which are occupied by the condenser coil units 40, 42 and 44 in such a way that the fins 48 thereof fit in horizontal orientation similar to the arrangement of the fins 32 for the radiator tubes 20, are completely enclosed by insulation means 58. The insulation means 58 includes vertical walls 60 and 62 between each of the groupings 18 of radiator tubes 20 and the condenser coils and extend vertically between the upper and lower headers and are of a width so as to completely segregate the groupings of radiator tubes and the condenser coils. The vertically disposed insulation walls 60 and 62 are connected at their upper and lower ends by top and bottom insulation walls 64 and 66. Thus, the insulation means 58, which may be formed from any suitable fibrous insulation material, is of generally rectangular open formation or configuration and extends between the upper and lower headers and engages the underside of the upper header and the top side or face of the lower header and is of a width equal to the width of the headers, as shown in FIGURE 2.

In this way, the insulation means 58 prevents the heat from the condenser coils to be transferred into the water in the radiator tubes and the heat from the water in the radiator tubes from being transferred to the refrigerant in the condenser coils.

Figure 3:
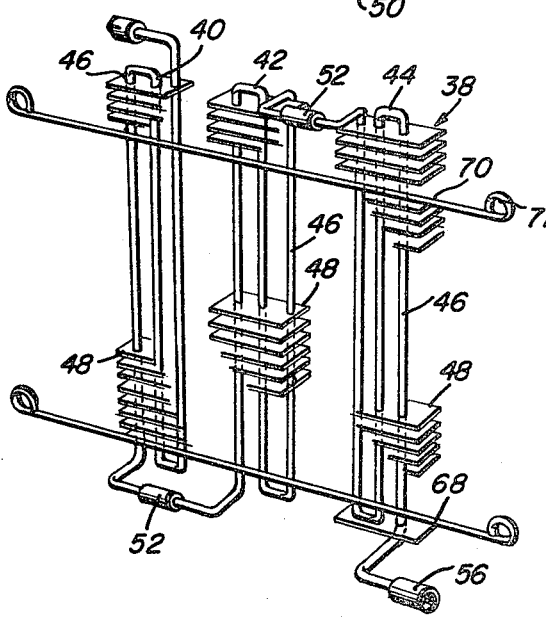
FIGURE 3 is a perspective view of the condenser unit per se.

It can be appreciated, that the condenser unit 38 is placed to provide maximum cooling at a minimum of cost and that it is separate unit, as shown in FIGURE 3. In this regard, the coils are provided with mounting rods 68 and 70 which have terminal eyelet ends 72 for attachment to the shank portions of the bolts of the bolt assemblies 26. Thus, the refrigerant condenser unit 38 can be bodily installed and removed as an entity or unit and, when the air conditioning system is not in use, the same may be removed and the water cooling radiator unit 12 will continue to function in the same manner as if the condenser unit were present.

Filler panels may be inserted into the blanked out spaces of the radiator when the condenser coil is not assembled therewith in order that air flow through the radiator tubes will be normal in velocity and volume. Such filler panels may be mounted on the front or rear of the radiator and may be slotted to provide the same resistance to air flow as the condenser coil does when it is in place.

It can be appreciated that the individual and separate condenser unit 38 is placed alongside the water cooling unit or radiator 12 with the units disposed in coplanar relationship, transversely of the longitudinal axis of the frame structure 22 of the vehicle so that cool air flows through both units at the same temperature for both rather than in tandem relation where the air is heated as it first passes through the condenser coil when it is conventionally mounted in front of the radiator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an automotive vehicle having an air conditioning system for cooling the interior thereof and a water cooled engine; a radiator and refrigerant condenser arrangement comprising a water cooling radiator unit for the engine and a condenser unit in which a refrigerant for the air conditioning system is cooled and liquefied, said units being disposed in side by side, separate and individual relation transversely of the longitudinal axis of the vehicle, and insulation means interposed between such units to prevent heat transfer between the units, said radiator unit being provided with blanked out portions spaced apart transversely of the longitudinal axis of the vehicle, said condenser unit being arranged in said blanked out portions with said insulation means bounding the sides of the blanked out portions transversely of the longitudinal axis of the vehicle, said radiator unit including vertically oriented radiator tubes, said radiator tubes being arranged in transversely spaced groupings creating the blanked out portions therebetween, said condenser unit including groups of condenser coils arranged in and substantially filling said blanked out portions, and separate inlets and outlets for the radiator unit and condenser unit.

2. The structure as defined in claim 1 wherein said radiator tubes and condenser coils are finned, a single common upper header for the radiator tubes and a single common lower header for the radiator tubes with the inlet and outlet of the radiator tubes communicated therewith, and means interconnecting the groups of finned condenser coils in flow communication with each other with the inlet and outlet therefor communicated therewith.

3. The invention of claim 2, wherein said interconnecting means is arranged rearwardly of and at the lower end of the arrangement.

4. The invention of claim 3, wherein said insulation means comprises vertically disposed laterally spaced insulation walls between the headers, said walls being interconnected at their upper and lower ends by lateral insulation top and bottom walls defining an insulation chamber in which the finned condenser coils are housed.

5. The invention of claim 4, including a common means for removably attaching the groups of finned condenser coils to a bracket means on the vehicle for supporting the radiator unit.

6. A combined vehicle radiator and refrigerant condenser comprising a single upper header and a single lower header, groupings of finned radiator tubes interconnecting said headers, said tube groupings being spaced apart laterally of the headers leaving blank spaces therebetween, finned refrigerant condenser coils for an air conditioning unit for a vehicle positioned in said blank spaces and being in interconnected flow communication, said condenser coils substantially filling the blank spaces, separate inlets and outlets for the radiator tubes and refrigerant condenser coils, and insulation means interposed between the refrigerant condenser coils and the groupings of radiator tubes and between the condenser coils and the headers, such insulation means causing the blank spaces to be completely heat segregated from the groupings of radiator tubes and headers so that there is no heat transfer between the refrigerant condenser coils and the radiator tubes and headers.

References Cited
UNITED STATES PATENTS

| | | | |
|---|---|---|---|
| 1,745,544 | 2/1930 | Karmazin | 165—140 |
| 1,806,712 | 5/1931 | Schulman | 123—41.19 |
| 1,870,457 | 8/1932 | Kenney | 165—140 |
| 2,789,794 | 4/1957 | Moore | 62—243 XR |
| 3,306,067 | 2/1967 | Anglin | 62—244 XR |
| 3,315,731 | 4/1967 | Jensen et al. | 165—42 |

ROBERT A. O'LEARY, *Primary Examiner.*

M. A. ANTONAKAS, *Assistant Examiner.*